Patented Jan. 10, 1928.

1,655,462

UNITED STATES PATENT OFFICE.

IVAN GUBELMANN AND HENRY R. LEE, OF SOUTH MILWAUKEE, WISCONSIN, ASSIGNORS TO THE NEWPORT COMPANY, OF CARROLLVILLE, WISCONSIN, A CORPORATION OF DELAWARE.

PROCESS OF PREPARING LEUCO QUINIZARINE.

No Drawing.   Application filed January 25, 1926.  Serial No. 83,735.

This invention relates to a method of preparing leuco quinizarine, which is a well known anthraquinone derivative ordinarily made by reduction of quinizarine.

In the co-pending application of Ivan Gubelmann, Serial No. 66,426, filed November 2, 1925, it has been shown that 2-chloro- (or 3-chloro)-1,4 dihydroxy anthraquinone, which shall herein be referred to as chloro-quinizarine, can be made in a simple way by condensing 3,4 dichloro-phenol with phthalic anhydride in the presence of concentrated or fuming sulphuric acid and boric acid.

We have now discovered that if finely divided metal powder is added to the finished reaction mass (containing chloro-quinizarine dissolved in the concentrated sulphuric acid and boric acid mixture), the chlorine atom in the chloro-quinizarine is eliminated and hydrochloric acid gas given off. At the same time, we have found that the ketone groups in the anthraquinone molecule are subjected to a reduction by the addition of the metal powder and that leuco-quinizarine is formed as the end product. It is evident that the metal powder added to the reaction mixture furnishes hydrogen in nascent form, which effects the reduction.

The reactions involved are probably best represented by the following equation:

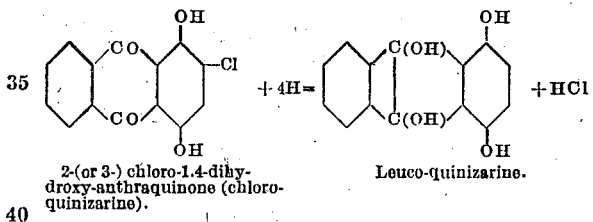

2-(or 3-) chloro-1.4-dihy-
droxy-anthraquinone (chloro-
quinizarine).

Leuco-quinizarine.

We prefer to condense 3,4 dichlorophenol with phthalic anhydride in the presence of 100% sulphuric acid in making the chloro-quinizarine, but it has also been shown in the co-pending application above referred to, that excellent results may be obtained with fuming sulphuric acid or a sulphuric acid being slightly weaker than 100%. The aforesaid reaction is best carried out at temperatures around 200° C.

For the reduction of the chloro-quinizarine to leuco-quinizarine, it is necessary to work at much lower temperatures, as for instance at 0–30° C. when the finely divided metal powder is brought into reaction. If higher temperatures are used, a great deal of hydrogen gas escapes the reaction without being used up in the intended reduction.

While we do not desire to limit our invention to any particular procedure, the following example in which parts by weight are given, will serve to illustrate our preferred method:

Example: 50 parts of 3,4 dichlorophenol, having a melting point of 64° C., are added to 950 parts of 100% sulphuric acid, together with 55 parts of boric acid and 150 parts of phthalic anhydride. The reaction mixture is well agitated and the temperature gradually raised to 195–200° C., where it is kept for four hours. The mixture gradually assumes a bright red color which becomes more intense as the reaction proceeds. After four hours of heating, no appreciable increase in the intensity of the color should be apparent and the formation of the chloro-quinizarine is then regarded as finished.

The mass is now cooled to 15° C. and, while agitated, 15 parts of finely divided aluminum powder are added over a period of about 24 hours. From the escaping hydrochloric acid gas the progress of the reaction may be observed. After all the aluminum powder has been entered, the reaction mixture is stirred for an additional 36–48 hours at a temperature of 15–30° C. The reaction is regarded as finished when no more hydrochloric acid gas escapes from the reaction apparatus. The reaction mass is now poured into 19,000 parts of cold water. The leuco-quinizarine precipitates in the form of greenish brown flocks, which are easily filtered off and washed free of acid. For the purpose of obtaining a product of very high purity, the reaction product may be dried and dissolved in toluol or other suitable solvent; from which it crystallizes in well defined crystals having the melting point of leuco-quinizarine, as given in the literature. The usual characteristics of leuco-quinizarine, as for instance the solution in organic solvents and in sulphuric acid are identical with those obtained with leuco-quinizarine prepared by the reduction of quinizarine.

We are aware that numerous details of the process may be varied through a wide range without departing from the spirit of this invention, and we do not desire limiting the patent granted other than as necessitated by the prior art.

We claim as our invention:

1. The process of preparing leuco quinizarine from a reaction mass containing chloro-quinizarine produced by the condensation of 3,4-dichlorophenol with phthalic anhydride, in the presence of concentrated sulphuric acid and boric acid, which comprises adding to the reaction mass without isolation of the chloro-quinizarine a finely divided metal powder adapted to produce nascent hydrogen, whereby the chloro-quinizarine is reduced and chlorine simultaneously eliminated to form leuco quinizarine.

2. The process of preparing leuco quinizarine from chloro-quinizarine, which comprises adding to an acid solution thereof a finely divided metal powder adapted to produce nascent hydrogen, whereby the chloro-quinizarine is reduced and chlorine simultaneously eliminated to form leuco quinizarine.

In testimony whereof we have hereunto subscribed our names.

IVAN GUBELMANN.
HENRY R. LEE.